(12) United States Patent
Hawkins et al.

(10) Patent No.: US 7,376,846 B2
(45) Date of Patent: May 20, 2008

(54) CHARGING AND COMMUNICATION CABLE SYSTEM FOR A MOBILE COMPUTER APPARATUS

(75) Inventors: Jeffrey Charles Hawkins, Redwood City, CA (US); Peter Skillman, San Carlos, CA (US); Karl A. Townsend, Los Altos, CA (US)

(73) Assignee: Palm, Inc., Sunnyvale, CA (US)

( * ) Notice: Subject to any disclaimer, the term of this patent is extended or adjusted under 35 U.S.C. 154(b) by 395 days.

(21) Appl. No.: 11/047,830

(22) Filed: Jan. 31, 2005

(65) Prior Publication Data

US 2005/0134581 A1 Jun. 23, 2005

Related U.S. Application Data

(63) Continuation of application No. 09/977,867, filed on Oct. 14, 2001, now Pat. No. 6,980,204.

(51) Int. Cl.
*G06F 1/00* (2006.01)
(52) U.S. Cl. .................................... 713/300; 320/108
(58) Field of Classification Search ............... 713/300; 320/23, 108
See application file for complete search history.

(56) References Cited

U.S. PATENT DOCUMENTS

| | | | | |
|---|---|---|---|---|
| 4,394,613 A | * | 7/1983 | Cole | 320/164 |
| 4,849,682 A | * | 7/1989 | Bauer et al. | 320/106 |
| 5,043,650 A | * | 8/1991 | Bhagwat et al. | 320/150 |
| 5,180,961 A | * | 1/1993 | Tsujino | 320/161 |
| 5,481,177 A | * | 1/1996 | Hamley | 320/111 |
| 5,510,808 A | | 4/1996 | Cina, Jr. et al. | |
| 5,584,054 A | | 12/1996 | Tyneski et al. | |
| 5,619,555 A | | 4/1997 | Fenton et al. | |
| 5,627,978 A | | 5/1997 | Altom et al. | |
| 5,672,952 A | * | 9/1997 | Szepesi | 320/164 |
| 5,745,904 A | | 4/1998 | King et al. | |
| 5,797,089 A | | 8/1998 | Nguyen | |
| 5,797,098 A | | 8/1998 | Schroeder et al. | |

(Continued)

FOREIGN PATENT DOCUMENTS

| | | |
|---|---|---|
| EP | 0704788 A2 | 4/1996 |
| FR | 2760933 A1 | 9/1998 |
| WO | WO 99/08238 A1 | 2/1999 |

OTHER PUBLICATIONS

Definition of Handheld Computer, Dictionary.com [online] [Retrieved on Feb. 11, 2004] Retrieved from the Internet<URL:http://dictionary.reference.com>.

(Continued)

*Primary Examiner*—Chun Cao
*Assistant Examiner*—Vincent T Tran
(74) *Attorney, Agent, or Firm*—Fenwick & West LLP

(57) ABSTRACT

A charging and communication cable system for a handheld computer system is disclosed. The charging and communication cable system includes a first interface for connecting to the handheld computer system, a second interface for connecting to another computer system, and a third interface for coupling to a charger system. In one embodiment, the third interface used to coupled to a charger system is the same as the interface on the handheld computer system such that the charger may be coupled to the charging and communication cable system or directly to the handheld computer system.

6 Claims, 10 Drawing Sheets

U.S. PATENT DOCUMENTS

| | | |
|---|---|---|
| 5,809,115 A | 9/1998 | Inkinen |
| 5,815,142 A | 9/1998 | Allard et al. |
| 5,860,074 A | 1/1999 | Rowe et al. |
| 5,917,905 A | 6/1999 | Whipple et al. |
| 5,949,764 A | 9/1999 | Yoshida et al. |
| 5,974,334 A | 10/1999 | Jones, Jr. |
| 6,002,944 A | 12/1999 | Beyda |
| 6,006,109 A | 12/1999 | Shin |
| 6,016,142 A | 1/2000 | Chang et al. |
| 6,029,072 A | 2/2000 | Barber |
| 6,035,214 A | 3/2000 | Henderson |
| 6,055,439 A | 4/2000 | Helin et al. |
| 6,084,951 A | 7/2000 | Smith et al. |
| 6,097,391 A | 8/2000 | Wilcox |
| 6,119,179 A | 9/2000 | Whitridge et al. |
| 6,124,700 A * | 9/2000 | Nagai et al. ............... 320/132 |
| 6,133,916 A | 10/2000 | Bukszar et al. |
| 6,169,911 B1 | 1/2001 | Wagner et al. |
| 6,188,917 B1 | 2/2001 | Laureanti |
| 6,192,118 B1 | 2/2001 | Bayless et al. |
| 6,215,865 B1 | 4/2001 | McCalmont |
| 6,243,452 B1 | 6/2001 | O'Shaughnessey et al. |
| 6,389,124 B1 | 5/2002 | Schnarel et al. |
| 6,405,172 B1 | 6/2002 | Baker et al. |
| 6,502,090 B1 | 12/2002 | Räisänen |
| 6,516,202 B1 | 2/2003 | Hawkins et al. |
| 6,534,953 B2 * | 3/2003 | Shirakawa ............... 320/114 |
| 6,557,004 B1 | 4/2003 | Ben-Shachar et al. |
| 6,577,721 B1 | 6/2003 | Vainio et al. |
| 6,583,806 B2 | 6/2003 | Ludwig et al. |
| 6,973,217 B2 | 12/2005 | Boliek et al. |
| 7,007,239 B1 | 2/2006 | Hawkins et al. |
| 2001/0034222 A1 | 10/2001 | Roustael et al. |
| 2002/0082043 A1 | 6/2002 | Wilska et al. |
| 2004/0028192 A1 | 2/2004 | Pelletier |
| 2006/0015819 A1 | 1/2006 | Hawkins et al. |
| 2006/0033706 A1 | 2/2006 | Haitani et al. |
| 2006/0121938 A1 | 6/2006 | Hawkins et al. |
| 2006/0161858 A1 | 7/2006 | Hawkins et al. |
| 2006/0168539 A1 | 7/2006 | Hawkins et al. |

OTHER PUBLICATIONS

Definition of Handheld, SearchMobileComputing.com, [online] [Retrieved on Feb. 11, 2004] Retrieved from the Internet <URL:http://searchmobilecomputing.techtarget.com>.

Excerpts from Handspring VisorPhone™ User's Guide, Copyright 2000, Handspring, Inc.

Excerpts from Motorola Timeport Tri-Band Mobile Telephone Manual, Copyright 1999, Motorola, Inc.

Excerpts from Ericsson Mobile Phone 1888 WORLD User's Guide, Copyright 1998, Ericsson Mobile Communications AB.

pdaCall (Patent Pending), www.bestnetcall.com, [online] [Retrieved on Aug. 31, 2001] Retrieved from the Internet<URL:https://www.bestnetcall.com/products/pda_call.htm>.

"Conference Calling Added to BestNet's Service Designed for Palm OS(R) Handhelds," Aug. 21, 2001, Yahoo! Finance, [online] [Retrieved Aug. 31, 2001] Retrieved from the Internet<URL:http://biz.yahoo.com/prnews/010821/latu097.html>.

* cited by examiner

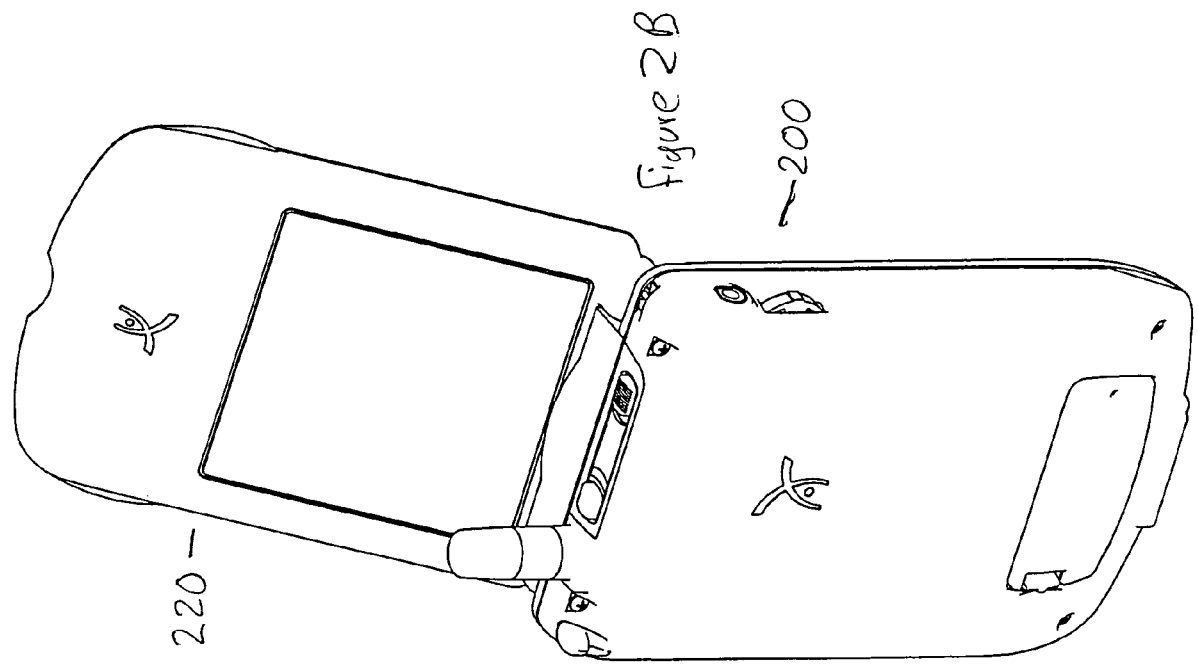
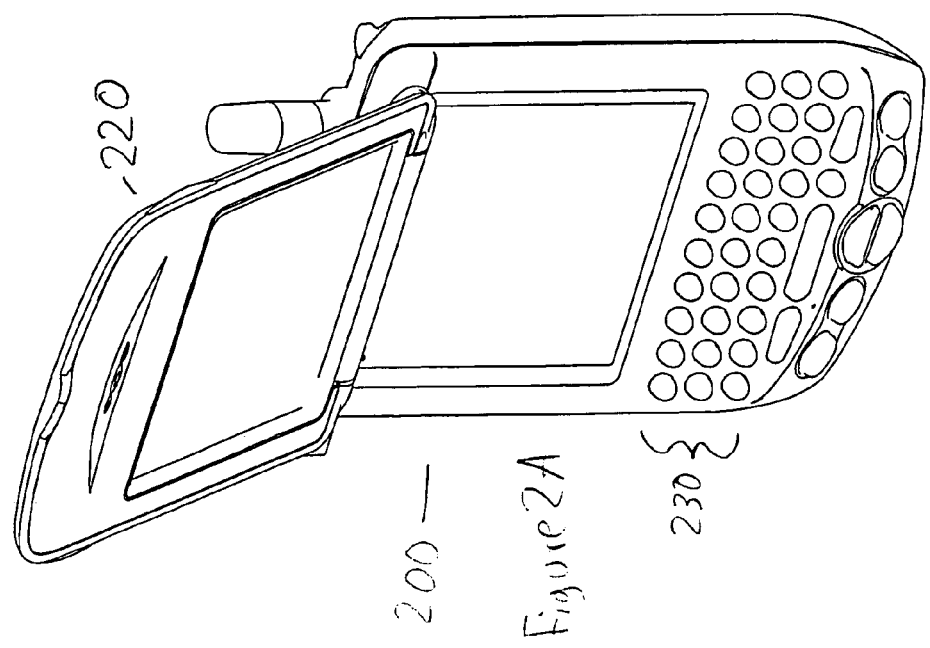

CHARGING AND COMMUNICATION CABLE SYSTEM FOR A MOBILE COMPUTER APPARATUS

RELATED APPLICATIONS

This patent application claims benefit to and is a continuation of the United States Patent Application entitled "CHARGING AND COMMUNICATION CABLE SYSTEM FOR A MOBILE COMPUTER APPARATUS," having Ser. No. 09/977,867 filed on Oct. 14, 2001 now U.S. Pat No. 6,980,204.

FIELD OF THE INVENTION

The present invention relates to the field of mobile computer systems. In particular the present invention discloses a charging system that is designed for both desktop usage and usage while traveling.

BACKGROUND OF THE INVENTION

Handheld computer systems have become a standard business tool for traveling professionals. Handheld computer systems allow traveling professionals to access large amounts of personal information such as an address book, a personal calendar, and a list of to-do items. In particular, handheld computer systems based upon the PalmOS® from Palm Computing, Inc of Santa Clara, Calif. have become the de facto standard of handheld computer systems. Most handheld computer systems are designed to synchronize information with a larger computer system such as a personal computer system.

The various owners of handheld computer system use their handheld computer systems in different manners. Some handheld computer system users work mainly with a desktop personal computer system but bring their handheld computer system when attending meetings. Other handheld computer system users constantly travel and rarely ever work in one place.

Furthermore, the personal computer systems owned by various handheld computer system users vary widely. Most handheld computer system users also use a desktop personal computer system. However, many use notebook personal computers. Some handheld computer system users use computer workstations such as those produced by Sun Microsystems, Inc. Other handheld computer system users do not use any other computer system at all.

It is impossible to accommodate the particular needs of all these different types of users with a single packaged handheld computer system product. However, it would be desirable to provide handheld computer system package that accommodates the needs of most of the potential purchasers with additional extra packages available for those users with less common requirements.

SUMMARY OF THE INVENTION

A charging and communication cable system for a handheld computer system is disclosed. The charging and communication cable system includes a first interface for connecting to the handheld computer system, a second interface for connecting to another computer system, and a third interface for coupling to a charger system. In one embodiment, the third interface used to couple to a charger system is the same as the interface on the handheld computer system such that the charger may be coupled to the charging and communication cable system or directly to the handheld computer system.

Other objects, features, and advantages of present invention will be apparent from the company drawings and from the following detailed description.

BRIEF DESCRIPTION OF THE DRAWINGS

The objects, features, and advantages of the present invention will be apparent to one skilled in the art in view of the following detailed description in which:

FIG. 2A is a front isometric view of an integrated stylus-based handheld computer and cellular telephone system.

FIG. 2B is a rear isometric view of an integrated keyboard-based handheld computer and cellular telephone system.

DETAILED DESCRIPTION OF THE PREFERRED EMBODIMENT

The disclosure of United States Patent Application entitled "CHARGING AND COMMUNICATION CABLE SYSTEM FOR A MOBILE COMPUTER APPARATUS," having Ser. No. 09/977,867 filed on Oct. 14, 2001, is expressly incorporated herein by reference.

A method and apparatus for constructing a portable computer system that can easily be expanded to handle many new add-on peripherals is disclosed. In the following description, for purposes of explanation, specific nomenclature is set forth to provide a thorough understanding of the present invention. However, it will be apparent to one skilled in the art that these specific details are not required in order to practice the present invention. For example, the present invention has been described with reference to the Handspring™ Springboard™ peripheral interface. However, the same techniques can easily be applied to other types of peripheral interfaces.

Handheld Computer Systems

Figure 1A:
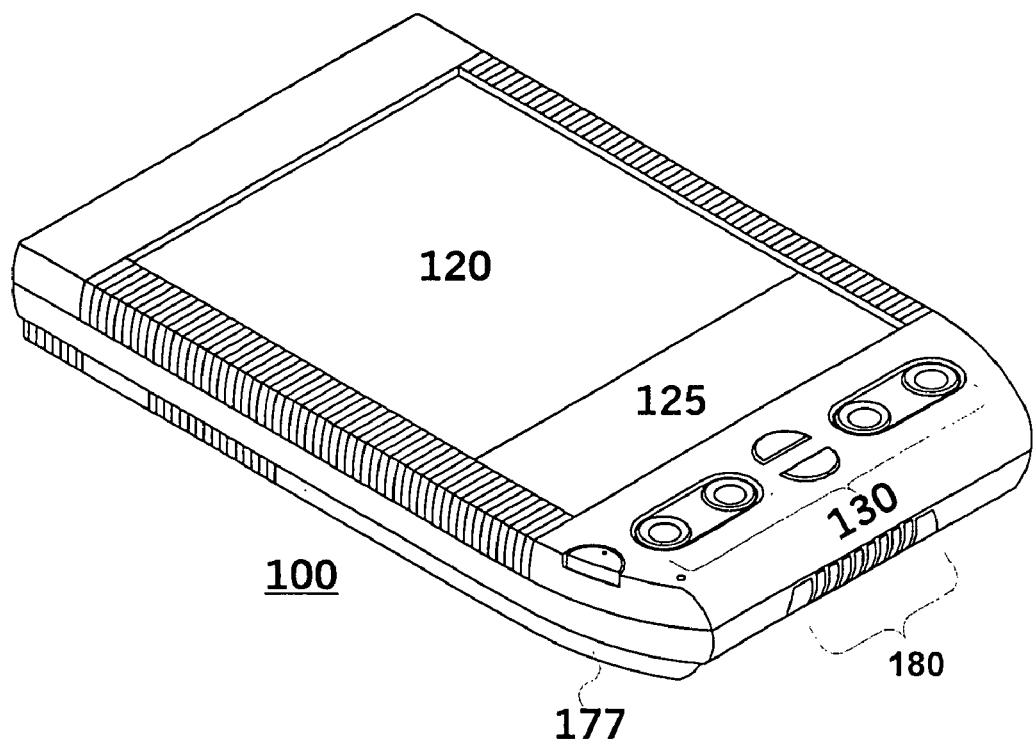
FIG. 1A illustrates a front view of a prior mobile computer system with an open external peripheral interface.
Figure 1B:
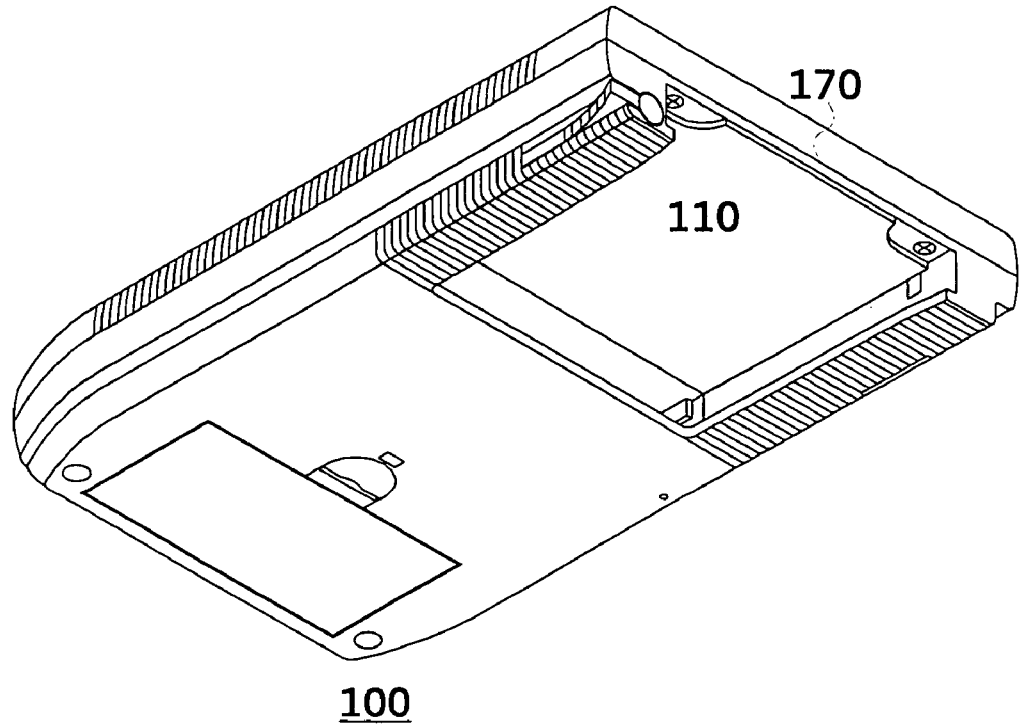
FIG. 1B illustrates a back view of a prior mobile computer system with an open external peripheral interface.

FIGS. 1A and 1B illustrate a typical handheld computer system 100. As illustrated in FIG. 1A, the mobile computer system includes a display area 120 for displaying information. The display area 120 is covered with a digitizer panel for entering information into the mobile computer system 100 using a stylus. The mobile computer system 100 further includes a set of external buttons 130 that may also be used to enter user input.

The handheld computer system 100 illustrated in FIGS. 1A and 1B is provided as an example only. Many different variations of handheld computer system exist. For example, other handheld computer systems may have built-in wireless digital network communication systems, large keypads, or may be combined with cellular telephone circuitry.

The handheld computer system 100 has an external interface 180 as illustrated in FIG. 1A. The external interface 180 may be used for communicating with external devices. Most current handheld computer systems use such an external interface 180 to communicate with a personal computer system. In this manner, the owner of handheld computer system 100 can share data between the handheld computer system 100 and the personal computer system.

The external interface 180 may also be used for supplying power to the handheld computer system 100. For example, the handheld computer system 100 may include an internal battery for powering the handheld computer system 100. If power is supplied to the handheld computer system 100 through external interface 180, the handheld computer system 100 may use the power from the external interface 180 instead of power from an internal battery. If the internal battery is rechargeable, the handheld computer system 100 may charge the battery when power is supplied to the handheld computer system 100 through external interface 180.

Many handheld computer systems are sold with a docking cradle that mates with the external interface 180 of the handheld computer system and connects to a desktop personal computer. The docking cradle is then coupled to a personal computer system using one of the popular personal computer system interfaces. Possible computer system interfaces include IEEE 1394, universal serial bus (USB) interface, and the older RS-232 serial interface. The docking cradle may also be used to charge the internal batteries of the handheld computer system by drawing power from the personal computer system or an external power supply.

More recent handheld computer systems incorporate wireless communication circuitry such that the handheld computer systems become personal communication devices that are carried with the user. Such wireless communication enabled handheld computer systems may act as a cellular telephone, a text-messaging device, an Internet browsing terminal, an email terminal or all of these things. FIGS. 2A and 2B illustrate one embodiment of an integrated handheld computer and cellular telephone system 200. The integrated handheld computer and cellular telephone system 200 includes a keyboard 230 such that the user may easily enter names, addresses, phone numbers, and email messages into application programs running on the integrated handheld computer and cellular telephone system 300.

With such wireless mobile communication abilities, a user will likely carry the handheld computer system around all the time. Thus, the need for more portable charging and synchronization systems exists.

Charger/Communication Cable Systems

Figure 3A:
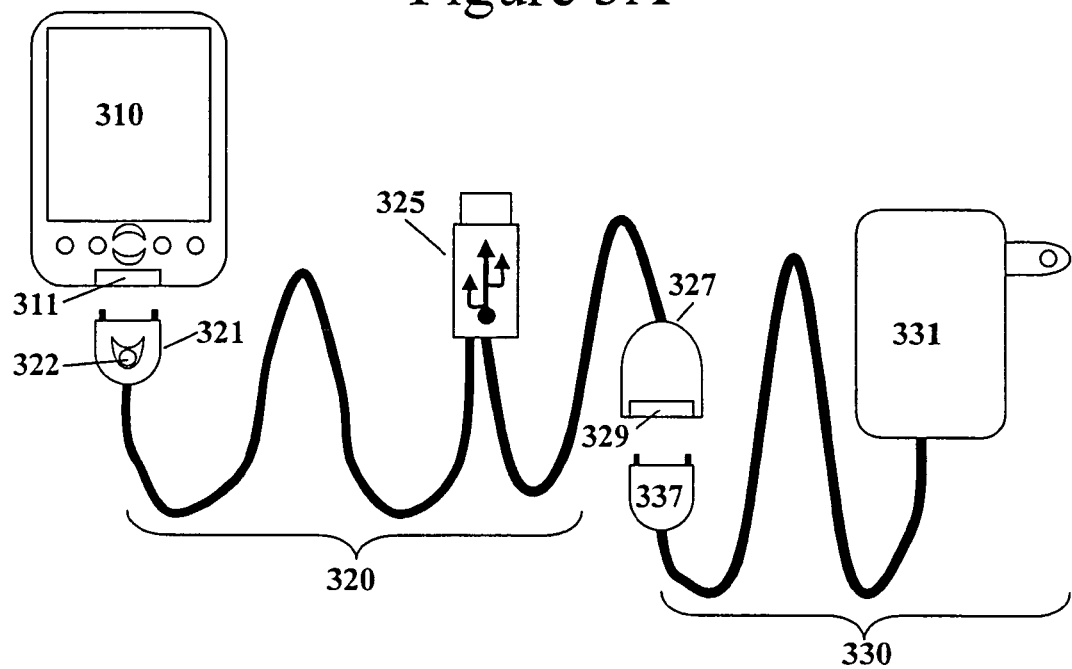
FIG. 3A illustrates an embodiment of a USB Charger/Communication cable system.

FIG. 3A illustrates a first embodiment of a Charger/Communication cable system. Referring to FIG. 3A, a handheld computer system 310 has an electrical interface 311 for receiving electrical power and data communication signals. To provide power to the electrical interface 311 of handheld computer system 310, a charger and communication cable system is provided. The charger and communication cable system consists of a Universal Serial Bus (USB) data-communication/charger cable 320 and a charger cable 330.

The USB data-communication/charger cable 320 has been designed to couple the handheld computer system 310 to another computer system (not shown). The USB data-communication/charger cable 320 couples the electrical interface 311 on the handheld computer system 310 to a Universal Serial Bus (USB) interface on another computer system (not shown). Specifically, interface connector 321 on USB data-communication/charger cable 320 couples USB signals to a USB connector 325 on data-communication/charger cable 320. Interface connector 321 may include a synchronization button 322 that can be used to indicate when a user wishes to have the handheld computer system 310 synchronize its databases with another computer system (not shown) coupled to USB connector 325.

The charger cable 330 comprises a power supply 331 and an interface connector 337 for coupling the power supply 331 to the handheld computer system 310. The power supply 331 may be comprised of a transformer and other electronics necessary to covert a local AC line current into a desired DC power current for the handheld computer system 310. Many different types of charger cable 330 embodiments may be created to adapt for the different AC line currents in different countries (i.e. 120 Volt/60 Hz or 220 Volt/50 Hz) and the different physical AC connectors used by different countries around the world.

When USB data-communication/charger cable 320 is coupled to the interface 311 on handheld computer system 310, charger cable 330 can provide power to the handheld computer system 310. Specifically, interface connector 337 of charger cable 330 may be coupled to interface 329 on electrical power connector 327 of USB data-communication/charger cable 320. Interface 329 on electrical power connector 327 of USB data-communication/charger cable 320 carries power from power supply 331 to the handheld computer system 310.

If the user of the handheld computer system 310 is traveling with out his personal computer, the user may elect to travel only with the charger cable 330 since the USB data-communication/charger cable 320 will not be needed. In such a circumstance, the user may connect the charger cable 330 to the handheld computer system 310 by coupling interface connector 337 directly to the electrical interface 311 of handheld computer system 310. The charger cable 330 carried by the traveling user may have different adapters and settings to allow it to operate with the different AC line currents in different countries and the different physical AC connectors used by different countries.

If there is a manner in which a user may misuse a device, such a misuse will generally eventually occur. With regard to USB data-communication/charger cable 320, a user may inappropriately connect the interface connector 321 end of data-communication/charger cable 320 to the electrical power connector 327 end of USB data-communication/charger cable 320. To prevent damage, interface 329 of electrical power connector 327 only contains conductors for electrical power such that no damage will occur if a user connects interface connector 321 to the electrical power connector 327 even if the USB connector 325 is connected to an operating personal computer system (not shown).

Figure 3B:
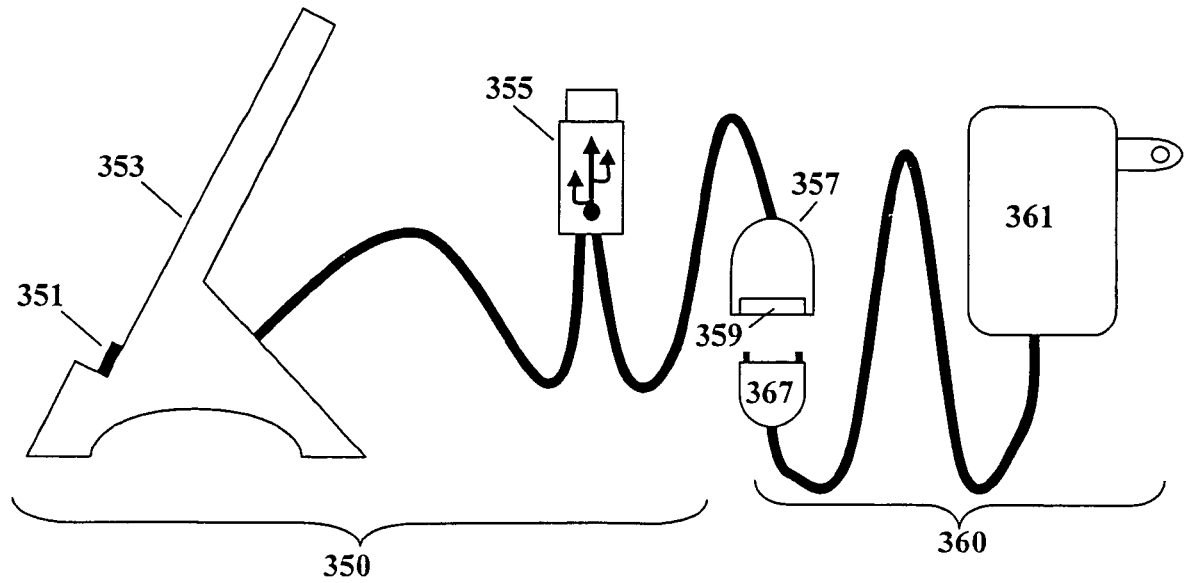
FIG. 3B illustrates an embodiment of a USB Charger/Communication docking cradle system.

FIG. 3B illustrates an alternate embodiment of the Charger/Communication cable system of FIG. 3A. In the embodiment of FIG. 3B, a serial docking cradle 353 is provided to allow the handheld computer system 310 to rest in the serial docking cradle 353. When handheld computer system 310 rests in serial docking cradle 353, the electrical interface 311 of handheld computer system 310 mates with the electrical interface 351 of serial docking cradle 353. This connection allows data communication with USB connector 355 and the power input through electrical power connector 327.

Serial Interface

Not all personal computer systems have USB communication ports. Furthermore, some operating systems do not adequately support the USB communication ports available on personal computer systems. To allow users in such predicaments use a handheld computer system, FIGS. 4A and 4B provide a serial communication port versions of the Charger/Communication cable system.

Figure 4A:
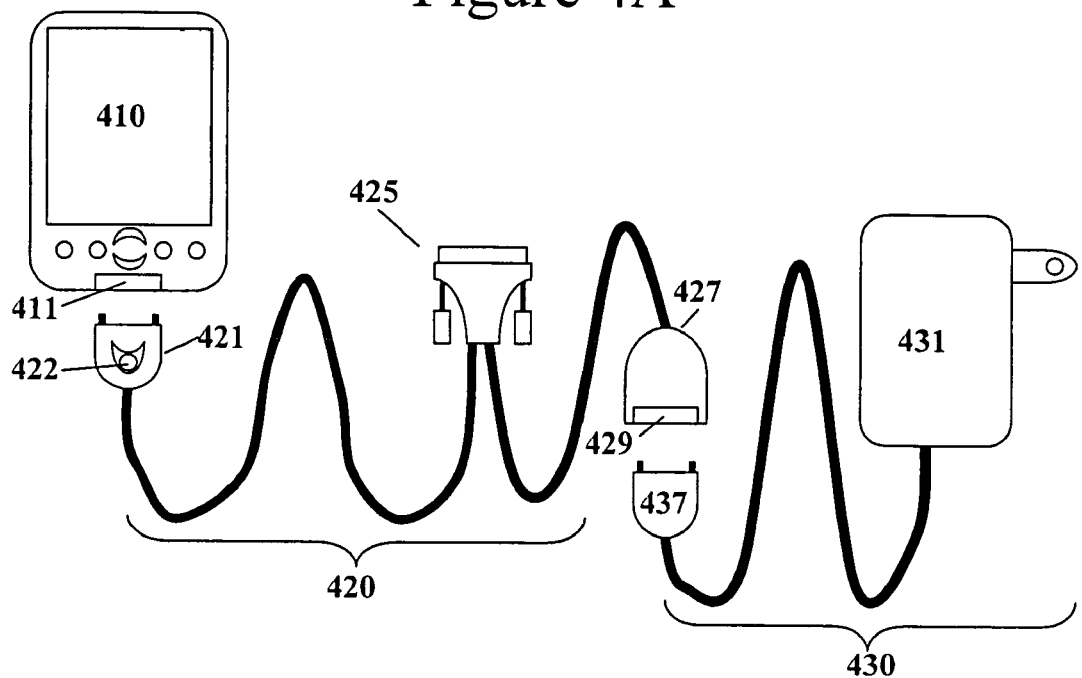
FIG. 4A illustrates an embodiment of a serial data-communication/charger system.

FIG. 4A provides a serial data-communication/charger cable 420 that is similar to the USB data-communication/charger cable 320 of FIG. 3A. The principal difference between serial data-communication/charger cable 420 and USB data-communication/charger cable 320 is that serial data-communication/charger cable 420 connects a serial port on handheld computer system 410 to a serial port on a personal computer system (not shown) using a serial connector 425.

Figure 4B:
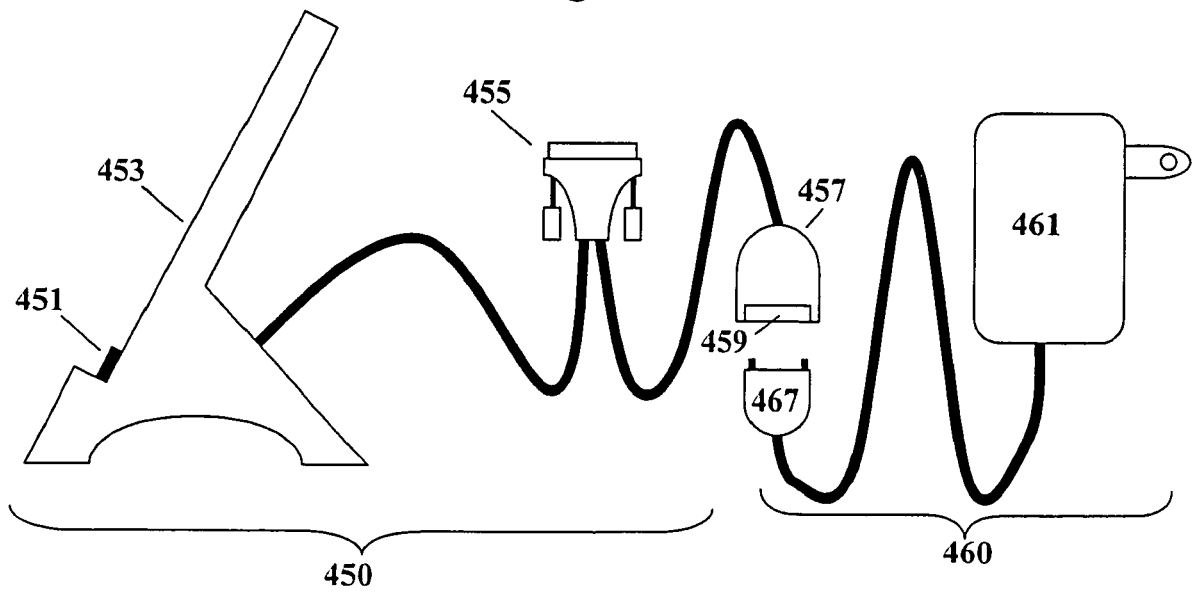
FIG. 4B illustrates a serial docking cradle Charger/Communication system.

FIG. 4B illustrates a serial docking cradle 453 for serial data communication and charging of a handheld computer system. The principal difference between serial docking cradle 453 and serial docking cradle 353 of FIG. 3B is that serial docking cradle 453 connects a serial port on handheld computer system 410 to a serial port on a personal computer system (not shown) using a serial connector 455.

Combined Travel/Docking System

Figure 5A:
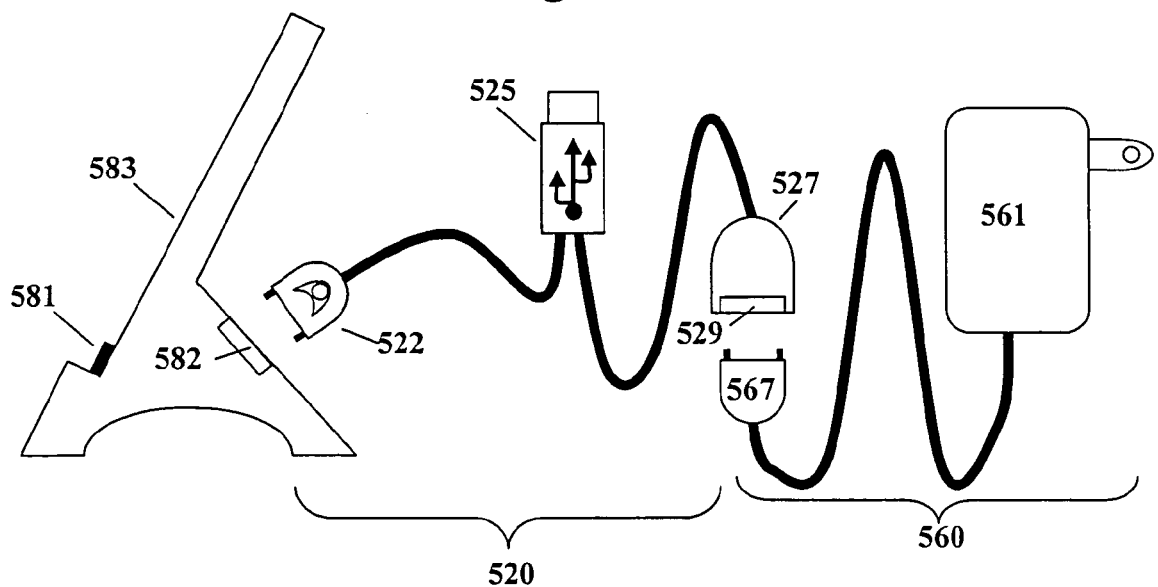
FIG. 5A illustrates a USB data-communication/charger cable with an associated docking cradle
Figure 5B:
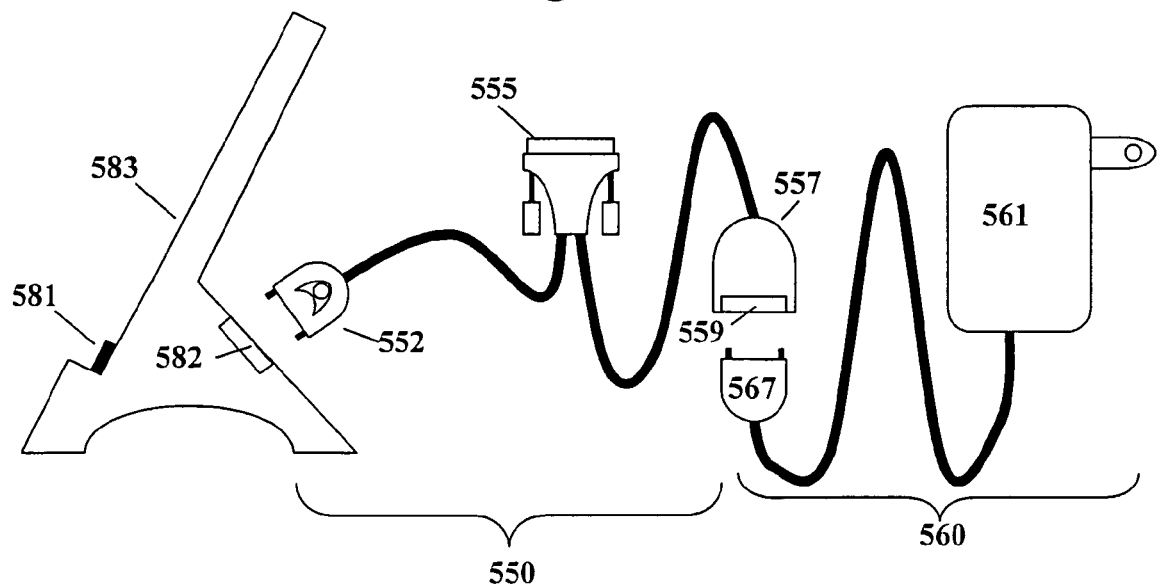
FIG. 5B illustrates a serial data-communication/charger cable with an associated docking cradle

FIGS. 5A and 5B illustrate alternate embodiments that combine the advantages of the previous embodiments. Specifically, FIGS. 5A and 5B provide both a docking cradle for normal office usage and a travel data-communication/charger cable for use while traveling.

FIG. 5A illustrates a USB data-communication/charger cable 520 that includes a connector 522 for coupling directly to a handheld computer system (not shown). When a handheld computer system is coupled to connector 522, the handheld computer may communicate with a personal computer system (not shown) coupled to connector 525 and receive power from charger 560 coupled to connector 529.

If the user wishes to use a docking cradle for normal office usage, the user may obtain docking cradle 583. Connector 522 of USB data-communication/charger cable 520 couples with interface 582 on the docking cradle 583. Interface 582 carries the electrical signals from connector 522 to an interface 581 on the docking cradle such that a user may easily couple a handheld computer system (not shown) to a personal computer and a charging system 560 by simply dropping the handheld computer system into the docking cradle 583.

FIG. 5B illustrates the same arrangement as FIG. 5A except that the USB data-communication/charger cable 520 has been replaced with a serial data-communication/charger cable 550. In this manner users that do not have a personal computer system with USB support can instead use a serial port connected to serial connector 555.

Note that the same docking cradle 583 may be used with both the USB data-communication/charger cable 520 and the serial data-communication/charger cable 550. In this manner, the handheld computer system may be sold with either the USB data-communication/charger cable 520 or the serial data-communication/charger cable 550. The purchasers of either those systems that desire a docking cradle may purchase the same optional docking cradle 583.

System with Off-the-Shelf Power Supply

Figure 6A:
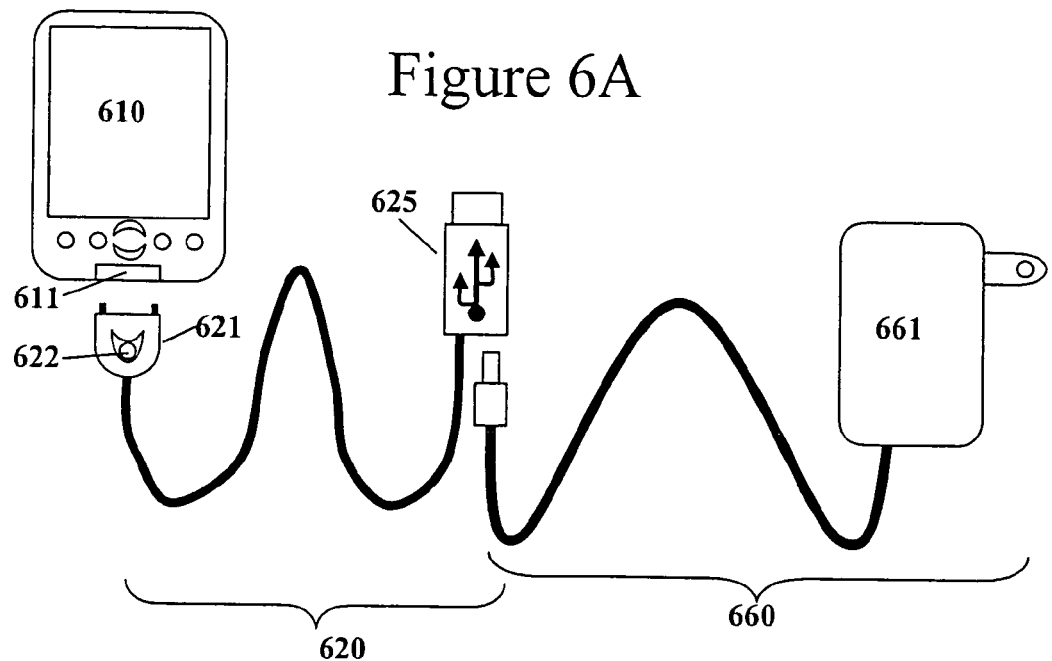
FIG. 6A illustrates an embodiment of a USB Charger/Communication cable system that uses an off-the-shelf power supply.
Figure 6B:
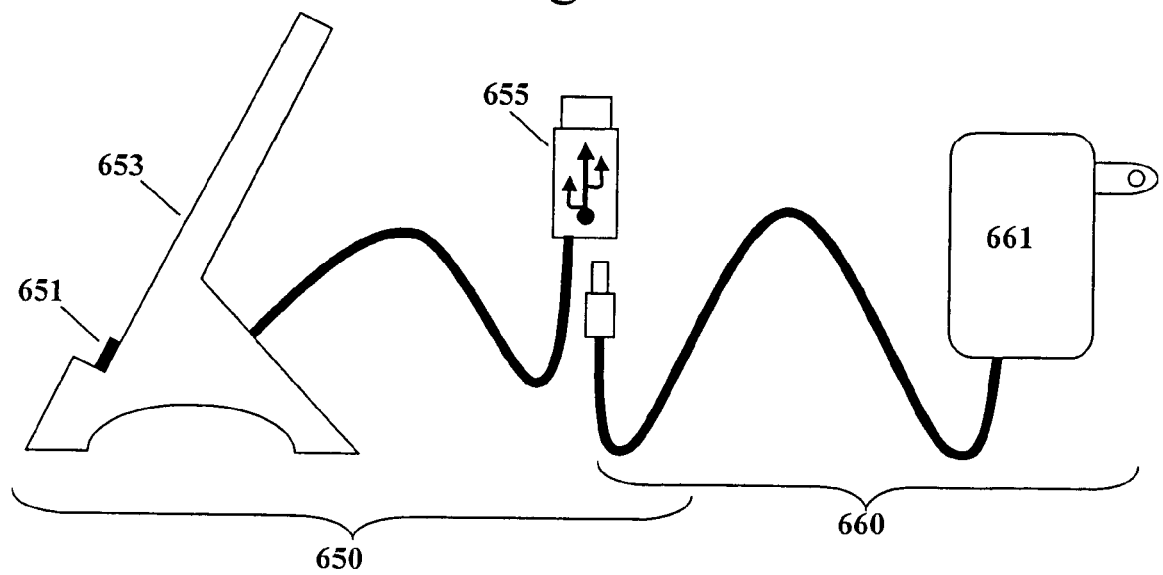
FIG. 6B illustrates an embodiment of a USB Charger/Communication docking cradle system that uses an off-the-shelf power supply.

To reduce the cost, an off-the-shelf power supply may be used instead of using a power supply with a special connector. FIGS. 6A and 6B illustrate an USB embodiment that uses an off-the-shelf power supply 660. In the embodiment of FIG. 6A, the power supply connects to the USB connector 625 to supply power to a USB data-communication/charger cable 620.

FIG. 6B illustrates a docking cradle embodiment that uses an off-the-shelf power supply 660. In another docking cradle embodiment (not shown), a user may purchase an optional docking cradle 583 such that connector 621 of USB data-communication/charger cable 620 may be coupled to interface 582 of docking cradle 583.

Figure 7A:
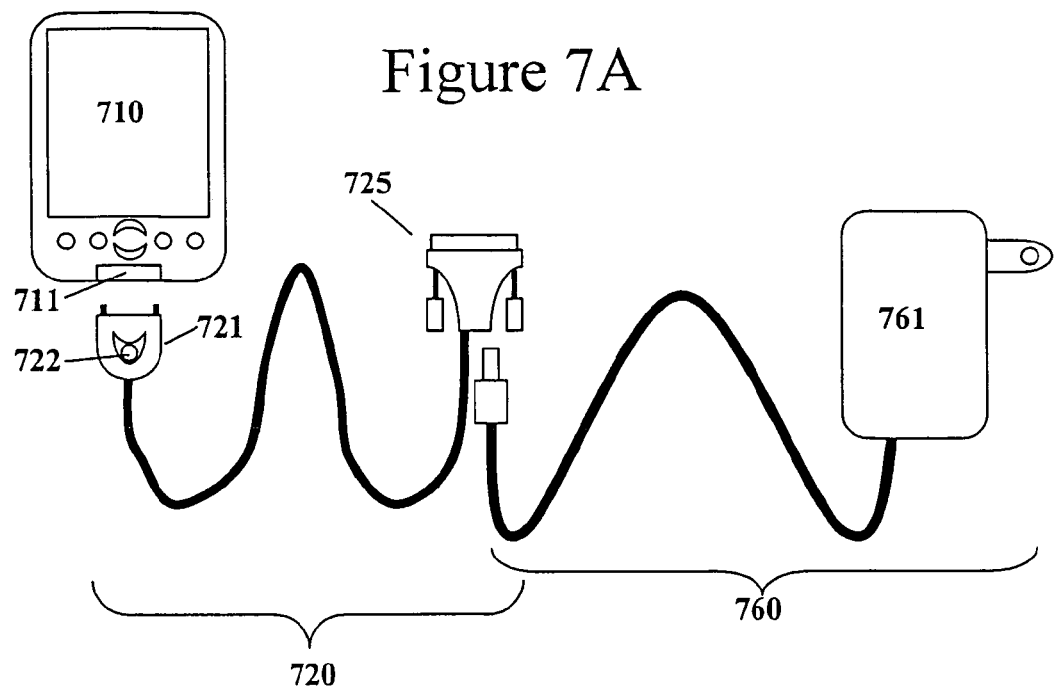
FIG. 7A illustrates an embodiment of a serial Charger/Communication cable system that uses an off-the-shelf power supply.
Figure 7B:
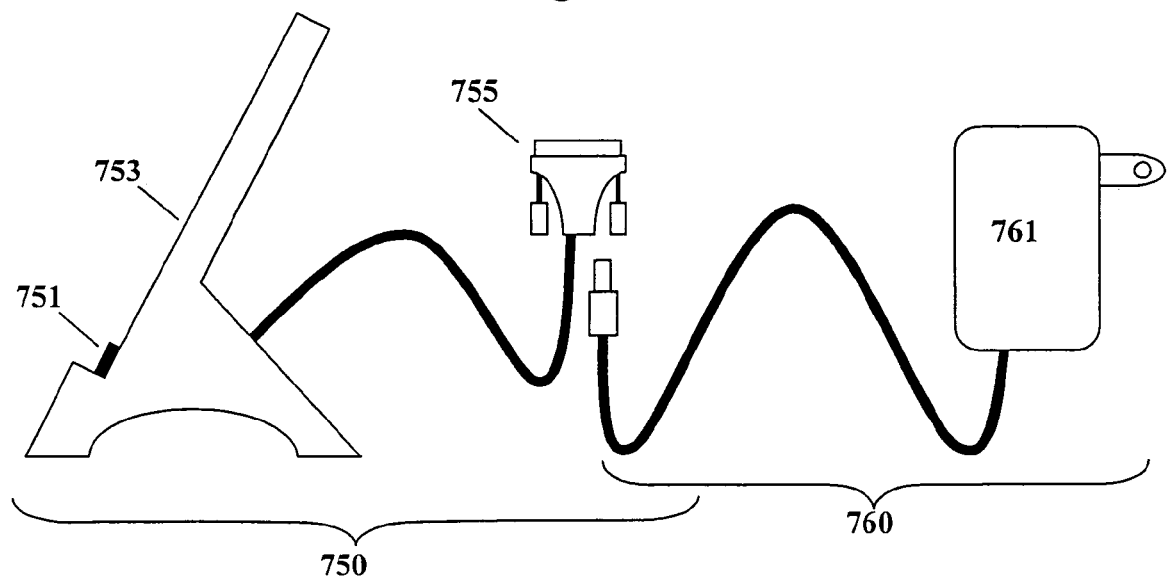
FIG. 7B illustrates an embodiment of a serial Charger/Communication docking cradle system that uses an off-the-shelf power supply.

FIGS. 7A and 7B illustrate serial interface embodiments similar to the USB embodiments of FIGS. 6A and 6B. A user with the serial data-communication/charger cable 720 of FIG. 7A may also use docking cradle 583 to obtain cradle functionality.

Charger Circuitry Systems

To charge a rechargeable internal battery in a handheld computer system, the handheld computer system usually contains dedicated charging circuitry. The charging circuitry monitors various battery conditions and determines when a charge is needed and when the battery is fully charged.

Figure 8:
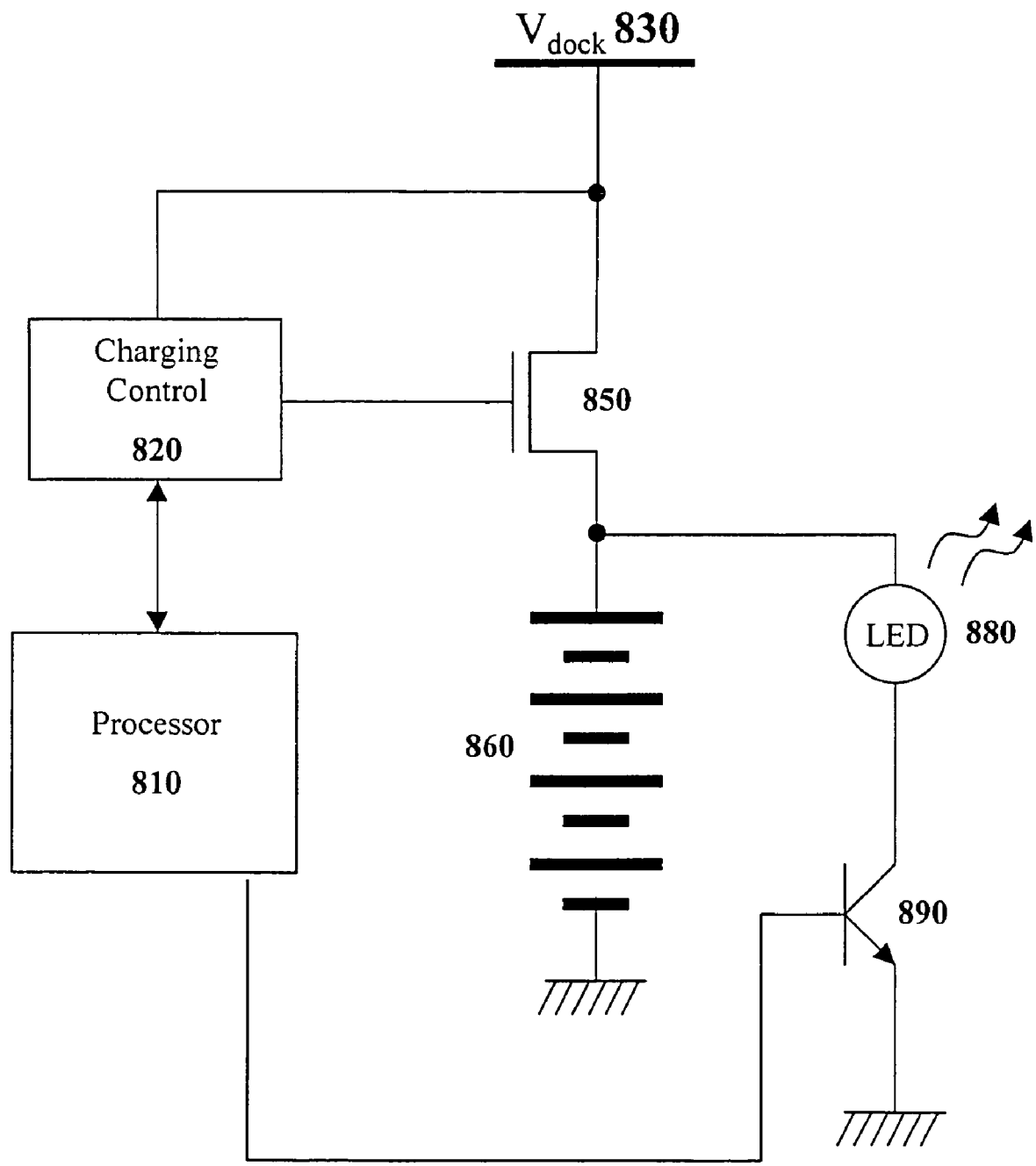
FIG. 8 illustrates a first embodiment of charging circuitry for a handheld computer system.

FIG. 8 illustrates one embodiment of charging circuitry for a handheld computer system. In the charging circuitry of FIG. 8, an external electrical interface $V_{dock}$ 830 is connected to a charging control circuitry 820. When the handheld computer system is placed in a charging docking cradle or otherwise connected to a charging source, charging control circuitry 820 detects a charging voltage on electrical interface $V_{dock}$ 830 and begins to charge the battery 860. The charging control circuitry 820 informs processor 810 such that the system may make necessary user interface adjustments.

In an alternate embodiment, charging control circuitry 820 detects a charging voltage on electrical interface $V_{dock}$ 830 and informs the processor 810. Processor 810 then determines that the battery 860 needs to be charged and instructs charging control circuitry 820 to charge the battery 860 if necessary.

The charging control circuitry 820 charges battery 860 by activating transistor 850 which supplies current from the external charging voltage on electrical interface $V_{dock}$ 830 to battery 860. In one embodiment, the charging control circuitry 820 charges the battery 860 over a three hour period. In a Lithium Ion battery embodiment, the charging begins a constant current "fast charge." As the charging nears completion (ninety percent charged in one embodiment), the charging control circuitry 820 slows the charging current down and uses a constant voltage "trickle charge."

The charging current also lights Light Emitting Diode (LED) 880 to inform the user that the battery is being charged. The processor 810 may control LED 880 during charging using transistor 890. In a preferred embodiment, the processor 810 may cause LED 880 to blink by consecutively turning on and off transistor 890 during the main charging phase. This informs the user that the battery is being charged. Once the charging is complete (or near complete), the processor 810 may cause turn on LED 880 by turning on transistor 890. In a preferred embodiment, the processor 810 blinks the LED 880 during the "fast charge" phase and then turns on LED 880 for a steady output during the "trickle charge" phase. If the user unplugs the charger before the trickle charge is complete, the user interface will calibrate itself to use the current charge status as the 100% charged state.

Silent Alarm

Processor 810 may use control LED 880 after charging is complete by using transistor 890. In this manner, processor 810 may use LED 880 to output information to the user. In a preferred embodiment, the system software may be modified to allow the user to select a "silent alarm" mode. In the silent alarm mode, the operating system of the handheld computer system will not emit audible alerts when programs request an alarm to be generated but will instead generate a "silent alarm" by blinking LED 880. In this manner, the handheld computer system will be able to notify the user of an event without emitting a disruptive audible alarm during a meeting.

One problem with the charging circuitry of FIG. 8 is that when charging control circuitry 820 has fully charged battery 860, then charging control circuitry 820 will turn off transistor 850 such that LED 880 begins to drain battery 860. Thus, battery 860 begins to discharge even though external power is available through electrical interface $V_{dock}$ 830. To prevent such discharging, the processor may turn off transistor 890. However, such an implementation would provide ambiguous feed back to the user. Specifically, the user would not know if the charging is complete or if the charger system was not properly plugged into an AC outlet.

Revised Charging and LED Control Circuitry

Figure 9A:
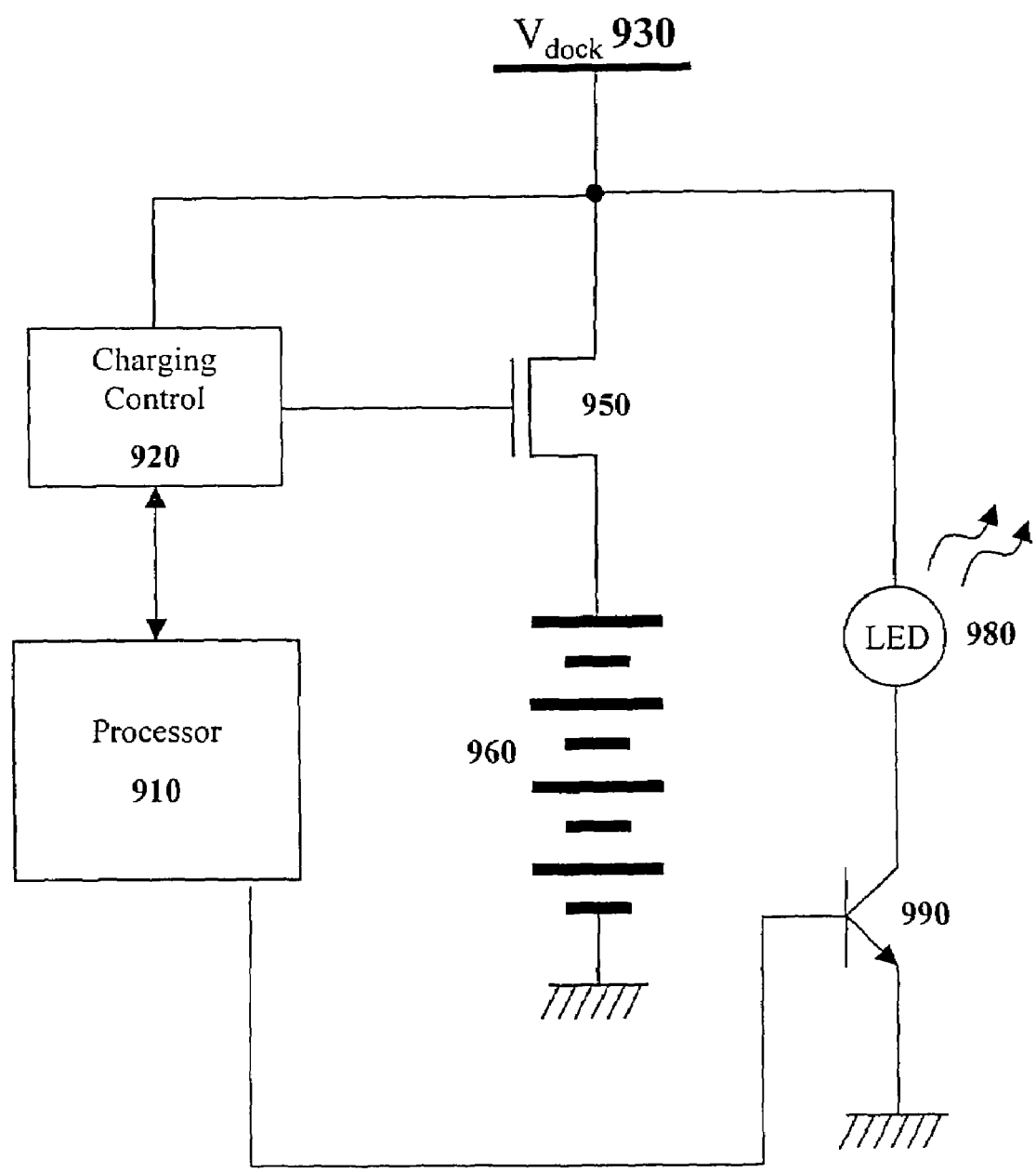
FIG. 9A illustrates an improved embodiment of charging circuitry for a handheld computer system.

To remedy this situation, FIG. 9A illustrates an alternate charging circuitry embodiment. In FIG. 9A, the power source of LED 980 has been moved above transistor 950. In this manner, when the charging control circuitry 920 has fully charged battery 960, then charging control circuitry 920 will turn off transistor 950 such that LED 980 is powered by the external power available through electrical interface $V_{dock}$ 930. Thus, LED 980 does not drain battery 960 after it has become charged. Note that processor 910 can still control LED 980 during charging using transistor 990.

The system of FIG. 9A provides all the same features as the system of FIG. 8 during charging. However, it might appear slightly less useful than the system of FIG. 9A when the handheld computer system is disconnected from the charging source and operating on battery 960 power. Specifically, it might appear that LED 980 cannot be used when operating only from battery power. However, this is not true due to the design of transistor 950. Specifically, transistor 950 is implemented with a transistor that contains a diode across the drain and the source such as Motorola's MGSF1P02LT1 P-Channel enhancement-mode TMOS MOSFET transistor.

Figure 9B:
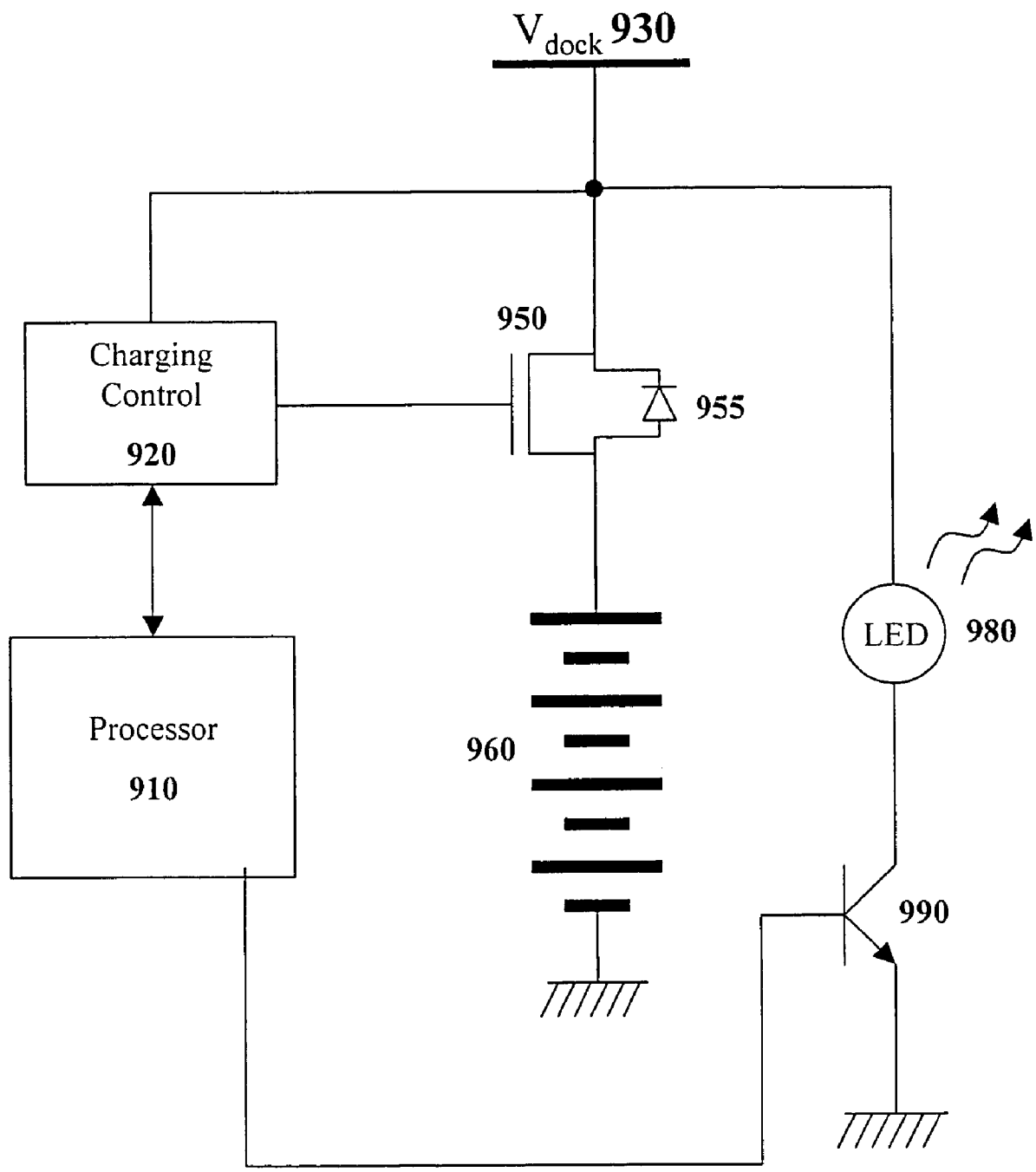
FIG. 9B illustrates a conceptual diagram of the charging circuitry of FIG. 9A that explains how leak current may power the LED.

FIG. 9B illustrates a diagram of such an embodiment. In the embodiment of FIG. 9B, when charging control circuitry 920 turns off transistor 950, current may flow from battery 960, up through diode 955, through LED 980, and down through transistor 990. Therefore, even though transistor 950 has been turned off, processor 910 can control LED 980 using transistor 990.

Thus, in the embodiment of FIG. 9B, LED 980 is only powered by the power received from electrical interface $V_{dock}$ 930 during charging. But when there is no charging voltage on electrical interface $V_{dock}$ 930, then LED 980 is powered by the battery 960. In either case, processor 810 can control LED 980 by controlling transistor 990.

The foregoing has described a portable computer system that can easily be expanded to handle many new add-on peripherals is disclosed. It is contemplated that changes and modifications may be made by one of ordinary skill in the art, to the materials and arrangements of elements of the present invention without departing from the scope of the invention.

We claim:

1. A charging circuit for a handheld computer system, said charging circuit comprising:
    a battery for operating the handheld computer system;
    a first transistor coupled to the battery for charging said battery using an external power source;
    a charging control circuit coupled to the first transistor for controlling said first transistor;
    an indicator circuit for indicating to a user at least a charging status of the battery and coupling of the charging circuit to the external power source, said indicator circuit coupled to the battery via the first transistor and coupled to the external power source, the indicator circuit powered by said battery using current from the battery passing through said first transistor responsive to said first transistor being turned off by the charging control circuit and the charging circuit disconnected from the external power source; and
    a processor coupled to a second transistor in a path of the current to switch on and off the indicator circuit.

2. The charging circuit of claim 1 wherein said indicator circuit comprises a light emitting diode.

3. The charging circuit of claim 1 wherein said first transistor comprises a field effect transistor.

4. A handheld computer system operated by a rechargeable battery, the handheld computer system comprising a charging circuit for charging the battery, the charging circuit comprising:
    a first transistor coupled to the battery for charging said battery using an external power source;
    a charging control circuit coupled to the first transistor for controlling said first transistor;
    an indicator circuit for indicating to a user at least a charging status of the battery and coupling of the charging circuit to the external power source, said indicator circuit coupled to the battery via the first transistor and coupled to the external power source, the indicator circuit powered by said battery using current from the battery passing through said first transistor responsive to said first transistor being turned off by the charging control circuit and the charging circuit disconnected from the external power source; and
    a processor coupled to a second transistor in a path of the current to switch on and off the indicator circuit.

5. The handheld computer system of claim 4 wherein said indicator circuit comprises a light emitting diode.

6. The handheld computer system of claim 4 wherein said first transistor comprises a field effect transistor.

* * * * *